April 22, 1930.  D. F. PRINTZ  1,755,894
JOINTER ATTACHMENT FOR PORTABLE SAWING MACHINES
Filed Dec. 16, 1927  2 Sheets—Sheet 1
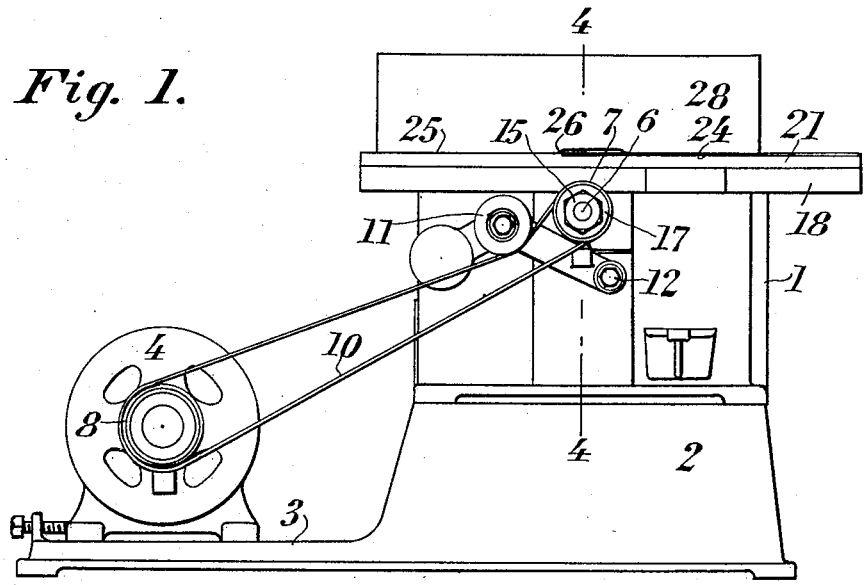
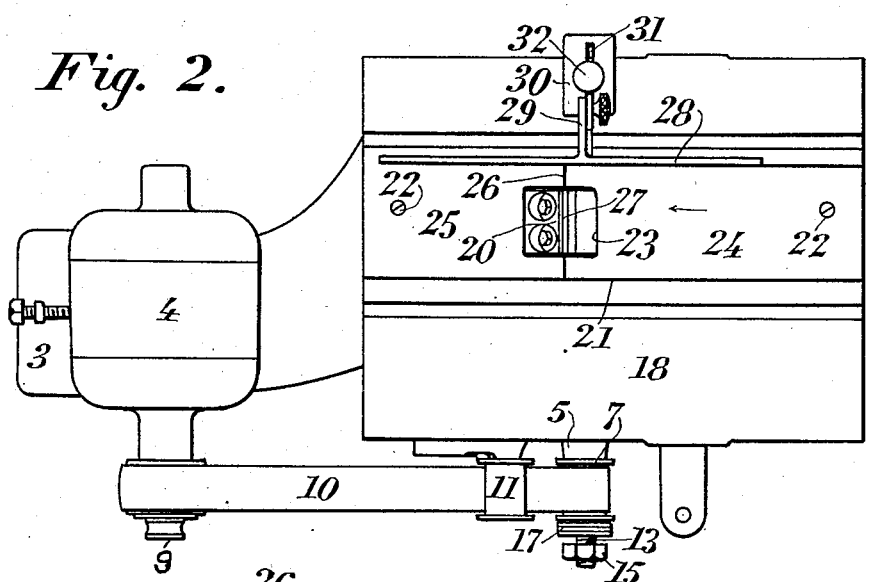
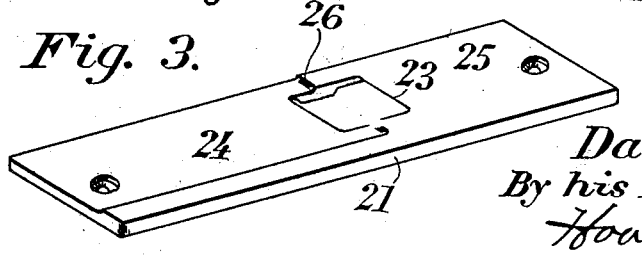
Inventor
Daniel F. Printz
By his Attorneys
Howson & Howson April 22, 1930.  D. F. PRINTZ  1,755,894
JOINTER ATTACHMENT FOR PORTABLE SAWING MACHINES Filed Dec. 16, 1927   2 Sheets-Sheet 2

Inventor
Daniel F. Printz
By his Attorneys
Howson & Howson

Patented Apr. 22, 1930

1,755,894

UNITED STATES PATENT OFFICE

DANIEL F. PRINTZ, OF READING, PENNSYLVANIA; THE PENN NATIONAL BANK AND TRUST COMPANY, EXECUTOR OF SAID DANIEL F. PRINTZ, DECEASED, ASSIGNOR TO EPHRATA MANUFACTURING COMPANY, OF EPHRATA, PENNSYLVANIA, A CORPORATION OF DELAWARE

JOINTER ATTACHMENT FOR PORTABLE SAWING MACHINES

Application filed December 16, 1927. Serial No. 240,472.

This invention relates to improvements in wood-working machines.

An object of the invention is to provide a jointer attachment for portable sawing machines.

Another object is to produce an efficient, strong and durable wood-working machine which may be economically constructed and operated.

Other objects and advantages will hereinafter appear.

The views of the drawings are:—

Figure 1 is a side elevation of a portable sawing machine, with the saw blade removed, and showing the machine equipped to do joining;

Fig. 2 is a plan of the structure shown in Fig. 1;

Fig. 3 is a detail perspective of the jointer plate;

Figure 5:
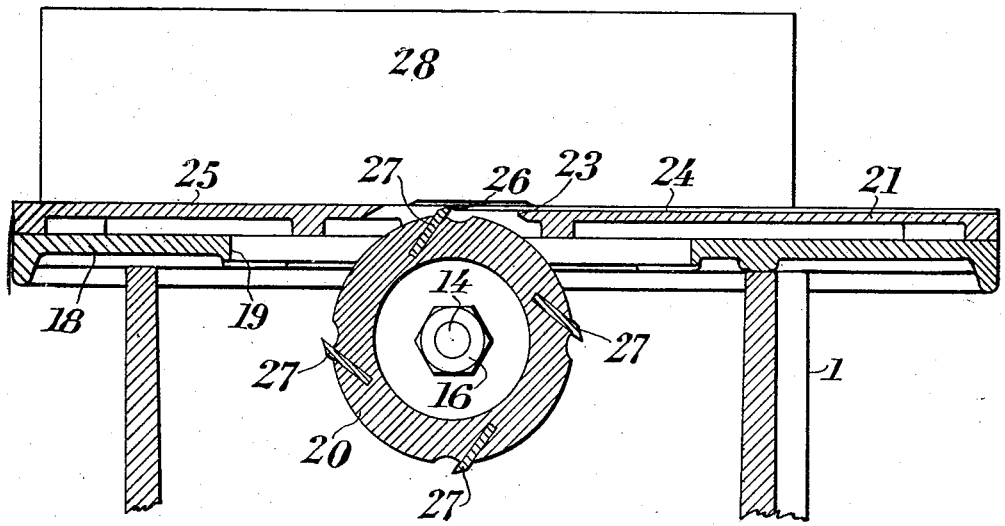
Fig. 5 is a vertical longitudinal section as seen from the line 5—5 of Fig. 4.

Referring to the drawings, the machine comprises a frame 1 that is mounted on a base 2.

The base 2 has an extended bottom portion 3 for the purpose of supporting an electric motor 4.

Mounted in a bearing 5, that is carried by the frame 1, is a horizontally disposed spindle 6.

On the outer end of the spindle there is fixed a pulley 7 which is connected to a pulley 8 on shaft 9 of the motor 4 by means of a belt 10.

The tension of the belt 10 may be controlled through a suitable tensioning device 11 pivotally mounted to the frame 1, as indicated at 12, Fig. 1.

Each end of the spindle is threaded. The outer end on which the pulley 7 is mounted is threaded, as indicated at 13, while the inner end of the spindle is threaded, as indicated at 14.

Nuts 15 and 16 are respectively screwed on to the threaded portions 13 and 14 of the spindle.

The portion of the spindle between the nut 15 and the pulley 7 may carry a plurality of washers 17. Sanding disks, or other such devices, (not shown), can be mounted on the outer end of the spindle. These devices can be correctly positioned and clamped on the spindle by means of the nut 15 and washers 17, as will be readily understood.

The top of the frame supports a work-table 18. The table is provided with a rectangular opening 19 that it so disposed as to overlie the inner end of the spindle 6. The opening is preferably formed longitudinally of the table, as clearly shown in Fig. 5.

Figure 4:
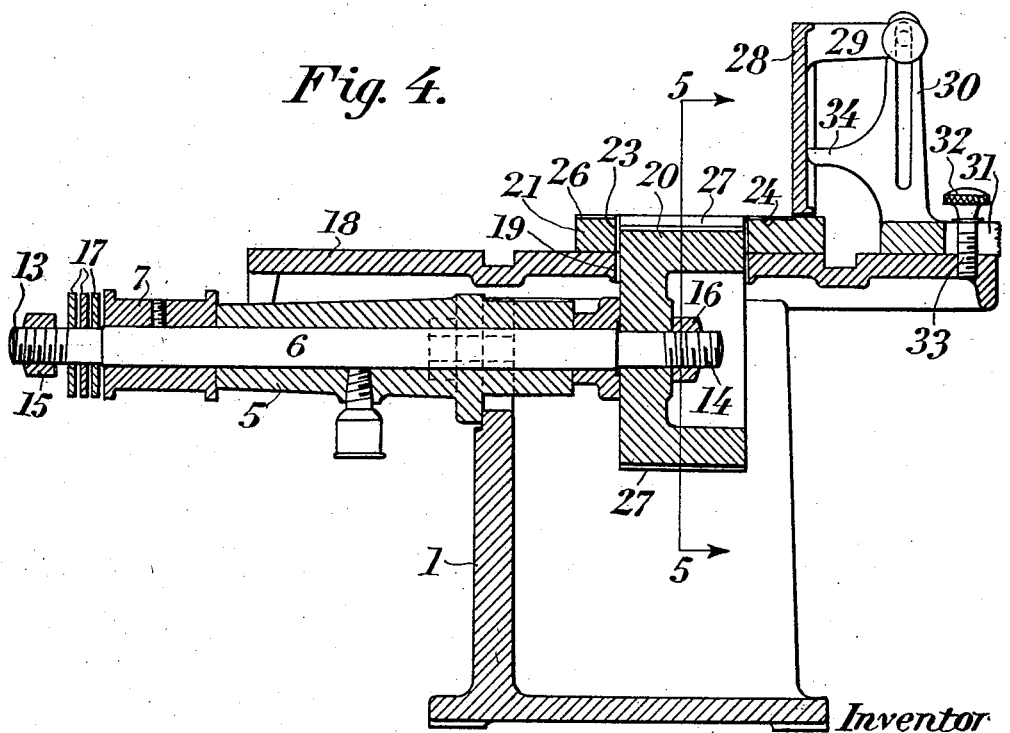
Fig. 4 is a vertical transverse section as seen from the line 4—4 of Fig. 1.

The inner end of the spindle 6 is adapted to have mounted thereon circle saws, and other types of cutting tools. The machine is primarily intended for sawing, but it is so constructed as to be adapted for other purposes. In the present instance I have shown the machine equipped to do joining, the circle saw being removed from the inner end of the spindle 6, and a joiner cutting tool 20 mounted on the spindle in lieu thereof. The tool 20 is secured to the spindle by means of the bolt 16, in the manner best shown in Fig. 4.

The periphery of the tool 20 extends through the opening 19 a considerable distance above the top of the table 18, while the width of the tool 20 is such that the tool is slightly less than the width of the opening 19.

For the purpose of supporting the work to be cut by the tool 20 so that the desired thickness can be cut from the material, I use a plate 21. This plate is mounted on top of the table 18, being detachably secured thereto by means of screws 22 (Fig. 2).

The plate 21 is, as best shown by Fig. 3, rectangular in outline, and such plate is formed with a rectangular opening 23 through which the periphery of the tool 20 may project.

The opening 23 is preferably formed near the center of the plate 21, and the plate should have a length corresponding to the length of the table 18 (see Figs. 1, 2 and 5).

The plate 21 can be in the form of a casting which is so constructed that the thickness of the plate extending from the opening 23 to one end is less than the thickness of the remainder of the plate.

Thus, the upper surface of the plate is provided with a portion 24 that is not as high as a portion 25, the former portion being that part of the plate upon which the material rests before engaging the tool 20, while the latter portion is that part of the plate upon which the material rests after being cut.

In this way a pronounced step 26 is formed on top of the plate between the portions 24 and 25 thereof, such step being disposed approximately over the longitudinal axis of the spindle 6, as shown in Fig. 5.

The cutting tool 20 is provided around its periphery with a plurality of inclined cutting knives or blades 27. These blades are so formed as to remove a portion of the material as such material is fed towards the tool 20. In the present instance, the thickness of the cut made by the tool is equal approximately to the difference in elevation of the portions 24 and 25, such distance corresponding approximately to the distance the edges of the blades 27 project above the portion 24 of the plate 21. As the material is fed across the machine the portion 25 will thus serve as a support for maintaining the material uniform, and a straight cut surface will be produced, as will be readily understood.

Heretofore, so far as I am aware, it has been customary to construct the plate 21 of two parts, one of which was adapted to be movably supported independently of the other in order to regulate the thickness of cut desired (see Fig. 8 of United States Letters Patent No. 1,479,058, granted January 1, 1924 to Michael F. Daley, for Woodworking machine).

However, in the present instance, as the thickness of cut produced by the tool 20 is fixed, there is no reason for using an adjustably mounted plate. Therefore, a joining machine having a plate formed from a single piece, which plate has its upper surface provided with two elevations, as are the portions 24 and 25, is preferably satisfactory, and serves the purpose for which the present machine is designed.

For guiding the material past the tool 20, one longitudinal edge of the plate 21 has mounted thereon a vertically disposed plate 28.

The plate 28 has a laterally projecting arm 29 to which is pivotally connected the upper end of a bracket 30.

The bracket 30 is L-shaped, having a vertical portion and a horizontally disposed base portion that rests on the table 18.

A slot 31 is formed in the base portion of the bracket and a thumb-screw 32 is inserted through the slot and into a threaded opening 33 with which the table 18 is provided. In this way the relative position of the plate 28 with respect to the top of the machine can be readily adjusted.

The vertical portion of the bracket 30 has a laterally projecting arm 34 that extends towards the plate 28 to serve as means for rigidly retaining the plate in a vertical position and to prevent the plate 28 from moving towards the edge of the machine when the material is being fed past the tool 20. As shown, the arm 34 is located near the bottom of the bracket.

The invention set forth herein is, of course, susceptible of various modifications and adaptations.

The invention claimed is:—

1. A wood-working machine comprising a table having an opening therein, a spindle extending substantially parallel therebeneath, a cutting tool mounted on the spindle and having a cutting edge extending substantially transversely thereof, the said tool projecting through the opening in the table, and a plate superposed on the table and having an opening through which the periphery of the said tool projects and having portions adapted respectively to guide the material before and after it is cut, and a vertically and horizontally adjustable follower on said table adjacent the opening, to guide material past the cutting tool.

2. A wood-working machine comprising a table having an opening therein, a spindle, a tool mounted on the spindle projecting through the opening in the table, and a plate superposed on the table for receiving the work, said plate having an opening through which the cutting edges of the said tool project and its upper surface formed so as to conform to the thickness of cut, whereby the work will be evenly supported by the plate on both sides of said tool.

3. In a portable wood-working machine, a table having an opening formed therein, a spindle extending beneath the table and adapted for the selective attachment of any of a plurality of cutting tools, the opening of the table permitting extension therethrough of portions of any of said tools, a plate detachably engageable with the upper surface of said table and having an opening therein for the passage of a tool, a support secured to the table and adjustable transversely thereof and an edge guide carried by said support and vertically adjustable thereon to permit its engagement with the upper surface of said table or with the upper surface of said plate when applied to the table.

4. In a portable wood-working machine, a table having an opening formed therein, a spindle extending beneath the table and adapted for the selective attachment of any of a plurality of cutting tools, the opening of the table permitting extension therethrough of portions of any of said tools, a plate detachably engageable with the upper surface of said table and having an opening therein for the passage of a tool, a support secured to the table and adjustable transversely thereof and an edge guide carried by said support and vertically adjustable thereon to permit its engagement with the upper surface of said table or with the upper surface of said plate when applied to the table, said plate having zones of different thicknesses meeting at the approximate center of said opening.

5. In a portable wood-working machine, a table having an opening formed therein, a spindle extending beneath the table and adapted for the selective attachment of any of a plurality of cutting tools, the opening of the table permitting extension therethrough of portions of any of said tools, a plate detachably engageable with the upper surface of said table and having an opening therein for the passage of a tool, a support secured to the table and adjustable transversely thereof and an edge guide carried by said support and vertically adjustable thereon to permit its engagement with the upper surface of said table or with the upper surface of said plate when applied to the table, said plate having zones of different thicknesses meeting at the approximate center of said opening, an edge of said plate having a portion of uniform thickness for coaction with the lower edge of said guide.

DANIEL F. PRINTZ.